United States Patent [19]

Ogawa et al.

[11] Patent Number: 4,457,217
[45] Date of Patent: Jul. 3, 1984

[54] HOT DRINK MAKERS

[75] Inventors: Akira Ogawa, Mishima; Yasuyuhi Iida, Shizuoka, both of Japan

[73] Assignee: Toshiba Kikai Kabushiki Kaisha, Tokyo, Japan

[21] Appl. No.: 475,211

[22] Filed: Mar. 14, 1983

[30] Foreign Application Priority Data

Mar. 19, 1982 [JP] Japan .................. 57-44278

[51] Int. Cl.³ .............................................. A47J 31/00
[52] U.S. Cl. ...................................... 99/295; 219/314
[58] Field of Search ............... 99/279, 280, 281, 282, 99/291, 295, 300, 304, 307, 316; 219/311, 312, 314

[56] References Cited

U.S. PATENT DOCUMENTS

| | | | |
|---|---|---|---|
| 2,568,840 | 9/1951 | Zees | 99/282 |
| 3,085,494 | 4/1963 | Rosander | 99/281 |
| 3,149,556 | 9/1964 | Martin | 99/291 |
| 3,433,149 | 3/1969 | Karlen | 99/282 |
| 3,517,603 | 6/1970 | Bruenjes | 99/307 |
| 4,360,128 | 11/1982 | Neumann | 99/281 |

Primary Examiner—Robert W. Jenkins
Attorney, Agent, or Firm—Koda and Androlia

[57] ABSTRACT

A hot drink maker comprises an outer casing, a hot water tank located in the casing at a relatively high position and filled with hot water heated to a predetermined temperature, a device for controlling water supply in the hot water tank, a funnel filled with a material for preparing hot drink, and a storage tank disposed below the funnel for storing the prepared hot drink. The storage tank is suspended in a heat insulating box with air space therebetween and the air in the space is uniformly heated by an electric heater at a temperature suitable for drinking. A hot water supply pipe interconnects the hot water tank and the funnel through a spray head located above the funnel.

7 Claims, 2 Drawing Figures

FIG. I
PRIOR ART
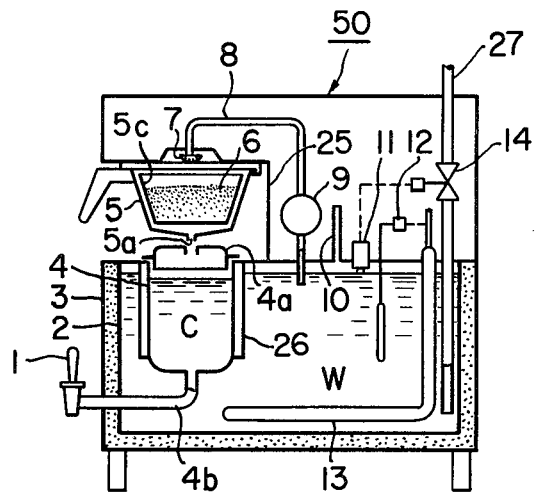
FIG. 2
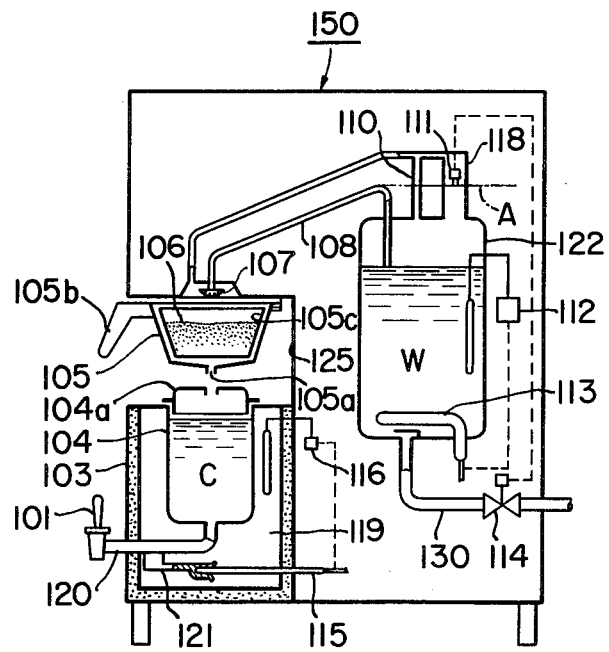

HOT DRINK MAKERS

BACKGROUND OF THE INVENTION

This invention relates to an automatic hot drink maker installed on a floor or counter in a store such as a food service shop and a restaurant, and more particularly, to an automatic coffee urn in which a brewed coffee storage tank is located independently of a hot water tank and is heat-conditioned to maintain a predetermined temperature suitable for drinking coffee.

Various types of hot drink makers have been proposed and one of them is of the type in which hot drink such as coffee or soup is prepared by pouring hot water onto powdered or ground material in a funnel member and stored in a hot drink storage tank to obtain prepared hot drink at any desired time.

An automatic coffee urn which is one example of a hot drink maker of the type described above will be described hereunder in conjunction with FIG. 1.

Referring to FIG. 1, an automatic coffee urn comprising a vertical casing 50 made of such as stainless steel in which a hot water tank 2 is located at the bottom of the casing 50 and the side and bottom walls of the tank 2 are surrounded by a heat-insulating material 3. A coffee storage tank 4 is suspended in the hot water tank 2 such that the upper end portion of the tank 4 extends horizontally and the outer edge of the upper end portion is attached to the upper end of the side wall of the tank 2 so as to constitute an upper cover of the hot water tank 2. A coffee funnel 5 in which a filter element 5c is provided and ground coffee 6 is loaded is detachably attached to an opening 25 formed on the front wall of the casing 50 just above a lid 4a fitted to the coffee storage tank 4 so that a flow out opening 5a opens just above an inlet hole provided for the lid 4a. The level of the hot water W in the tank 2 is detected by a water level detector 11 and an electromagnetic water supply valve 14 is operatively connected to the level detector 11 and controlled by a signal from the detector 11 to supply water into the tank 2 and always maintain a necessary amount of hot water W in the tank 2. The hot water W is heated by an electric heater 13 disposed in the low portion of the tank 2 and a temperature of the hot water W is suitably controlled by a thermostat 12 electrically connected to the heater 13. A pipe 8 has one end extending in the hot water W from the upper portion of the tank 2 and the other end provided with a spray head 7 which is positioned above the funnel 5 to spray the hot water W in the tank 2 onto the ground coffee powder loaded in the funnel 5 by the operation of a pump 9 incorporated in the pipe 8. The brewed coffee drink is fed through the flow-out opening 5a into the storage tank 4 and the coffee thus prepared and stored in the storage tank 4 is taken out as occasion demands by handling a cock 1 through an outlet pipe 4b connected to the bottom of the storage tank 4.

Regarding the automatic coffee urn of the type described above, the hot water W in the tank 2 will be maintained at 93°–97° C. which is deemed to be a temperature suitable for brewing coffee and the temperature of the brewed coffee C in the storage tank 4, which is suspended in the hot water tank 2, is also maintained at substantially 93°–97° C., which is considerably high temperature for the coffee to be drunk. Thus, the high temperature such as 93°–97° C. will make flavor of coffee disperse easily and degrade its quality and taste because a temperature suitable for drinking coffee is generally considered to be about 85° C. Therefore, it is undesirable to locate the coffee tank 4 in the hot water W having a high temperature of 93°–97° C. for a long time. In order to prevent the direct contact of the tank 4 with the hot water W, although a heat insulating jacket member 26 may be provided to surround the coffee tank 4 to form an air space therebetween, influence of the temperature of the hot water W upon the coffee C cannot be completely avoided even though the jacket 26 is arranged. In addition, as the cock 1 is usually positioned outside the casing 50 in the air, temperature of a first cup of coffee after a no-use long period is low in comparison with that of the coffee C in the tank 4 because at first heat of the coffee C is spent for warming the cock 1 and the temperature of the succeeding cup of coffee would be again about 93°–97° C. Thus, cups of coffee having uniform and desirable temperature cannot be obtained through the cock 1. Moreover, it is impossible to adjust the temperature of prepared hot drink in the storage tank so as to be suitable for kinds of drinks.

When a certain amount of hot water W has been spent on for brewing coffee and taking out of several cups of coffee and the water level in the tank 2 lowers, the level detector 11 operates to control the electromagnetic water supply valve 14 so as to supply water into a bottom portion of the tank 2 from a water source such as water service through a pipe 27 connected thereto. Since the supplied water is cold, it will stay at the bottom portion of the tank 2 and cool the coffee tank 4 if the bottom thereof is positioned at a relatively low position. In order to obviate this advantage, it is required to locate the coffee tank 4 at a relatively high level in the tank 4, which fact makes the volume of the tank 2 enlarge and requires much time to heat up the water in the tank to a predetermined temperature. Moreover, the manufacture of a large tank will bring about constructional problem such as welding work and require much time and expense for the manufacture.

In order to obviate the defects of the automatic coffee urn of the type described above, is provided an automatic coffee urn in which a coffee storage tank is located in a casing independently of a hot water tank, for example, as described in U.S. Pat. No. 3,149,556 to James S. Martin. In James, a coffee storage tank is located independently of a hot water tank and heated by a heater disposed only at the bottom of the storage tank. However, since the storage tank is heated only from the bottom, the whole wall structure of the storage tank is not uniformly heated and temperature difference exists at upper and lower portions thereof, i.e., the brewed coffee in the storage tank. Therefore, the coffee having a constant temperature cannot be obtained successively.

SUMMARY OF THE INVENTION

An object of this invention is to obviate defects of a prior art apparatus and provide a hot drink maker capable of obtaining cups of the hot drink successively having substantially the same temperature suitable for drinking.

Another object of this invention is to provide a hot drink maker in which a hot water tank and a prepared hot drink tank are independently located and maintained so as to always keep predetermined temperature, respectively.

According to this invention, there is provided a hot drink maker to be installed in a food service shop or restaurant comprising, a casing provided with an opening at a front wall thereof, a hot water tank located in the casing and filled with hot water heated to a predetermined temperature, means for controlling water supply into the hot water tank, a funnel filled with material for preparing hot drink and detachably fitted in the opening, a spray head located above the funnel, a hot water supply pipe inter-connecting the hot water tank and the spray head for supplying the hot water from the hot water tank into the funnel, a storage tank for storing prepared hot drink disposed in the casing just below the funnel, a heat insulating box arranged so as to surround the storage tank with space therebetween, a heater disposed in the space for heating uniformly the stock tank to be a predetermined temperature, and a cock for taking out the prepared hot drink in the storage tank through an outlet pipe extending from the bottom of the storage tank.

BRIEF DESCRIPTION OF THE DRAWINGS

In the accompanying drawing:

FIG. 1 is a schematic cross-sectional view of a prior art automatic coffee urn; and FIG. 2 is a schematic cross-sectional view of an automatic coffee urn according to this invention.

DESCRIPTION OF THE PREFERRED EMBODIMENT

Referring to FIG. 2, an automatic coffee urn according to this invention comprises a vertical casing 150 made of stainless steel, for example, and the casing 150 is provided at its front wall with an opening 125 in which a coffee funnel 105 is located. A cylindrical water-tight tank 122 in which hot water W is contained is disposed in the casing 150 at a relatively high position and a heat insulating box 103 is disposed at the low portion in the casing 150. A coffee storage tank 104 for storing brewed coffee C is disposed in the heat insulating box 103 in a suspended manner such that an upper flanged portion of the tank 104 extends horizontally and is attached to the upper end of the insulating box 103 so as to form a cover of the box. A lid 104a provided with a hole is fitted to the upper opening of the coffee storage tank 104 and a coffee funnel 105 is detachably attached to the opening 125 of the casing 150 just above the coffee tank 104 so that an opening 105a formed on the bottom of the coffee funnel 105 aligns with the hole of the lid 104a.

An electric heater 113 is located at the bottom portion of the hot water tank 122 to heat water W and temperature of the heated water is always measured and controlled to have a predetermined value by a thermostat 112 which is electrically connected to the heater 113. A pipe 130 interconnects the bottom of the tank 122 to a water source, such as water service, through an electromagnetic water supply valve 114. A pipe 108 for supplying hot water W in the tank 122 to the coffee funnel 105 is connected to the tank 122 so that one end of the pipe 108 extends into the tank 122 from the upper portion thereof by a predetermined length and to the other end of the pipe 108 is secured a spray head 107 so as to sprinkle the hot water W onto the ground coffee powder 106 in a filter element 105c in the funnel 105. In this arrangement, it is necessary to position the pipe 108 so that one end thereof opens in the tank 122 at a level higher than that of the spray head 107. A steam exhaust pipe 110 is connected at one end to the upper portion of the tank 122 and the other end opens to the atmosphere for exhausting steam or air in the tank 122 into the atmosphere preferably at a level above the funnel 105. A riser 118 is further provided for the upper portion of the tank 122 and connected to the pipe 110 as shown in FIG. 2 and in the riser 118 is arranged a water level detector 111, for example a float switch, which generates a signal to operate to close the water supply valve 114 when the water level of the hot water W in the tank 122 reaches to the level A during the water supply process through the pipe 130, the level A being substantially equal to the uppermost portion of the pipe 108. The coffee funnel 105 is generally detachably engaged with a circular rail means, not shown, attached to the upper wall of the opening 125 of the casing 150.

A pipe 120 is connected at one end to the bottom of the coffee storage tank 104 and a cock 101 is fitted to the other end of the pipe 120 to obtain a cup of coffee by handling the cock. An electric heater 115 is located in the space 119 formed between the insulating box 103 and the coffee storage tank 104 and the air temperature in the space 119 is controlled by a thermostat 116 which is electrically connected to the heater 115 to maintain the air temperature in the space 119 and to constantly heat the whole wall structure of the storage tank 104 to a predetermined value. The end portion of the pipe 120 near the cock 101 may be connected to the heater 115 through a heat conductive member 121 such as an aluminum plate to always heat the cock 101 to obtain a first cup of coffee having temperature suitable for drinking.

In the arrangement of the coffee urn of this invention, it is desirable to dispose two coffee storage tanks 104 side by side and in this case the coffee funnel 105 is constructed to be rotatable horizontally along the circular rail member attached to the opening portion 125 of the casing 150 and an opening 105a is provided at an excentric portion on the bottom of the funnel so that when the funnel is rotated, the opening 105a aligns with respective holes provided for the lids 104a of the tanks 104.

The automatic coffee urn according to this invention operates as follows.

At the starting time of operation of the coffee urn, water level of the hot water tank 122 is at the same level as that of the end opening of the pipe 108 extending in the tank 122 and the temperature of the hot water W is maintained to a temperature of 93–97° C. suitable for brewing coffee. The coffee funnel 105 filled with ground coffee 106 and fitted to a rail member attached to the casing 150 is positioned at a portion just above one of coffee storage tanks 104.

Under these conditions, depression of a push button, not shown, operates a relay means, not shown, connected to the water supply valve 114 to open the valve so as to supply water into the tank 122 through the supply pipe 130. Thus, the water level in the tank 122 rises and when the level reaches the predetermined level A in the riser 118, the level is detected by the level detector 111, generally a float switch, which generates a signal to control the relay means for closing the water suuply valve 114. Since the level A is substantially equal to the top portion of the pipe 108, the hot water W begins to flow towards the spray head 107 through the pipe 108 by siphon phenomenon when the valve 114 is closed and the hot water W is continuously supplied onto the ground coffee 106 in the funnel 105 until a time when the water level is again lowered to the original water level. Thus, the brewed coffee is fed and stored in the stroage tank 104 through the opening 105a provided for the bottom of the funnel 105.

The air between the coffee storage tank 104 and the heat insulating box 103 is preliminarily heated by the heater 115 and its temperature is controlled by the thermostat 116 so that the whole wall structure of the tank 104 is uniformly heated and the temperature of the coffee C supplied into the tank 104 is always kept at a value suitable for drinking, preferably, to about 85° C. Although the cock 101 is usually cooled by a surrounding air, the pipe 120 is thermally connected to the heater 115 by the heat conductive member 121, so that the cock 101 will be always kept at about 70°-75° C. and a cup of coffee taken out through the pipe 120 and the cock 101 has a good taste and temperature even if the coffee C is stored for a relatively long time in the coffee storage tank 104.

According to this invention, as described hereinabove, since a temperature for storing coffee can be kept at a suitable value regardless of the temperature of hot water to brew coffee, a cup of coffee with good flavor and taste can be obtained and location of a hot water tank independent of a coffee tank makes the structure thereof compact and reduces the time for heating hot water to a desired temperature. A compact tank can easily be manufactured by press workings, which can reduce troublesome welding works. In addition, the whole wall of a coffee storage tank is always heated uniformly at a relatively low predetermined temperature, so that cups of coffee with good taste and flavor can be successively obtained.

Although in the foregoings, coffee is described as one preferred example of hot drink, another hot drink such as soup will be prepared in consideration of temperature condition. The temperature control of the air in the space between the storage tank and the heat-insulating wall can easily be made by a thermostat connected to the heater to a temperature suitable for the kinds of the drinking.

What is claimed is:

1. A hot drink maker comprising:
    a casing provided with an opening at a front wall thereof;
    a hot water tank located in said casing and filled with hot water heated to a predetermined temperature;
    means for controlling water supply into said hot water tank;
    a funnel filled with material for preparing hot drink and detachably fitted to said casing in said opening;
    a spray head located above said funnel;
    a hot water supply pipe interconnecting said hot water tank and said spray head for supplying the hot water from said hot water tank to said funnel;
    a storage tank for storing prepared hot drink disposed in said casing just below said funnel;
    a heat insulating box arranged so as to surround said storage tank with space therebetween;
    a heater disposed in said space for heating uniformly said storage tank to a predetermined temperature; and
    a cock for taking out the prepared hot drink in said storage tank through an outlet pipe extending from the bottom of said storage tank.

2. The hot drink maker according to claim 1 wherein said means for controlling the water supply comprises a level detector for detecting the level of the hot water when it reaches a predetermined level and a water supply valve incorporated in a water supply pipe for supplying water into said hot water tank, said valve being operatively connected to said level detector so that said valve is closed when said level detector detects the predetermined level.

3. The hot drink maker according to claim 2 wherein said hot water supply pipe is bent to form a bent top portion and said predetermined level of said hot water substantially accords with that of said bent top portion of said hot water supply pipe.

4. The hot drink maker according to claim 1 wherein said hot drink outlet pipe is thermally connected to said heater.

5. The hot drink maker according to claim 4 wherein said hot drink outlet pipe is connected to said heater through a heat conductive material.

6. The hot drink maker according to claim 1 which further comprises a steam exhaust pipe having one end connected to the upper portion of said hot water tank and the other end opened in the atmosphere above said funnel.

7. The hot drink maker according to claim 1 wherein said heater disposed in said space is thermally controlled by a thermostat operatively connected to said heater.

* * * * *